Feb. 19, 1935.   S. STRATY   1,991,429
PRESSURE VESSEL AND CLOSURE THEREFOR
Filed June 24, 1933
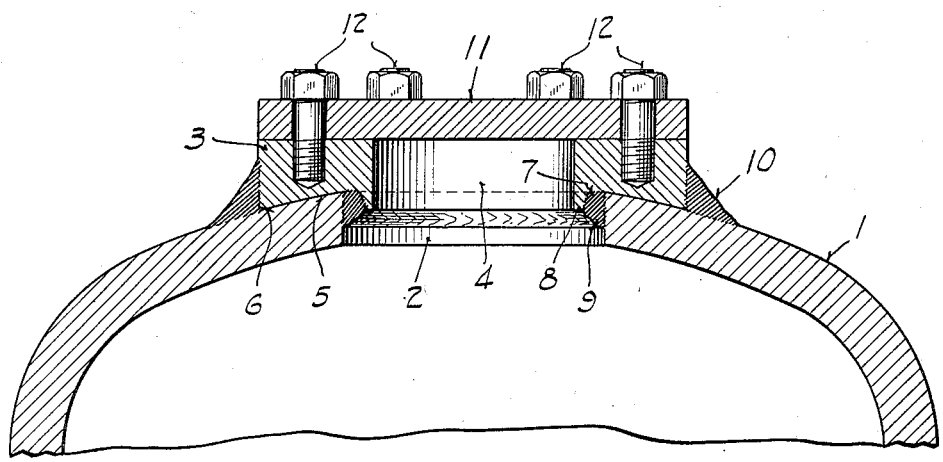
INVENTOR.
Stephen Straty
BY
ATTORNEY.

Patented Feb. 19, 1935

1,991,429

UNITED STATES PATENT OFFICE 1,991,429

PRESSURE VESSEL AND CLOSURE THEREFOR

Stephen Straty, Milwaukee, Wis., assignor to A. O. Smith Corporation, Milwaukee, Wis., a corporation of New York Application June 24, 1933, Serial No. 677,372

2 Claims. (Cl. 285—106)

This invention relates to a pressure vessel and closure therefor.

The object of the invention is to provide a simple and inexpensive closure for an opening in a pressure vessel.

Another object is to provide a reenforcement for an opening in a vessel.

The accompanying drawing illustrates an embodiment of the invention, and is a longitudinal sectional view through the end head of a vessel showing the construction of the reenforcement and closure.

The elliptical head 1 of the vessel has a manhole or opening 2 at its center.

In carrying out the invention, a reenforcing plate 3 is provided for the opening. The plate 3 is constructed from a single flat plate of suitable thickness and is cut to an outside diameter suitable for giving the required reenforcement to the vessel wall.

An opening 4 is cut through the plate 3 having a diameter substantially less than the opening 2 in the head 1.

The reenforcing plate 3 is then chamfered as at 5 on the underside to provide a concave or curved surface having the shape of the outer convex or curved surface of the vessel wall surrounding the opening 2. The chamfering extends approximately from the outer corner 6 of the plate 3 to a point 7, leaving a lip 8 extending downwardly at the inner circumference of the plate so that the inner edge of the plate 3 is the same thickness as the original plate.

The outer diameter of the lip 8 is less than the diameter of the opening 2 in the vessel head 1 so that when the reenforcing plate 3 is applied to the vessel head, the lip 8 extends inwardly in the opening 2 and forms a circumferential welding groove with the edge of the vessel wall, shown as filled with weld metal 9.

The vessel head 1 fits into the chamfered portion of the plate 3 as indicated.

In attaching the reenforcing plate 3 to the vessel, weld metal 10 is applied at the outer circumference of the plate to weld the plate to the outside of the head, and the weld metal 9 is deposited in the groove as already described so that the plate is integrally united to the vessel head at both the inner and outer circumferences of the plate.

The welding is preferably accomplished by the electric arc, using a covered metallic electrode such as is employed in the manufacture of pressure vessels by this method.

In closing the opening, a cover plate 11 having the same diameter as the plate 3 is applied and bolted to the plate 3 by means of lugs 12. Any suitable number of lugs 12 may be employed.

The invention may be applied at other locations in the vessel, as for instance, in the side wall as well as in the head, and may be applied to flat wall portions as well as curved.

Various modifications of the invention may be employed within the scope of the accompanying claims.

I claim:

1. In a pressure vessel, a curved wall having an opening therein, a substantially flat reinforcing plate ring surrounding the opening and positioned with its flat surface in the general direction of a plane tangential to the vessel surface at the opening, said plate ring being chamfered on its side adjacent the vessel to receive the curved wall, the chamfering of the plate ring providing lip edges at its inner circumference extending into the opening in the vessel wall and forming a welding groove with the edge of the vessel wall, weld metal deposited in said welding groove and uniting said plate to the vessel wall at the edge of said opening, and weld metal uniting said plate at its outer circumference to the vessel wall.

2. In a pressure vessel, an end head of curved construction and having an opening at its center, a substantially flat rolled reinforcing plate ring surrounding the opening and positioned with its flat surface in the direction of a plane tangential to the head surface at the opening, said plate ring being chamfered on its side adjacent the head to receive the curved wall, the chamfering of the plate ring providing lip edges at its inner circumference extending into the opening of the head and forming a welding groove with the inner edge of the head, weld metal filling said groove and welding the plate to the head, and weld metal uniting said plate at its outer circumference to the head, said reenforcing plate ring being attached to receive a cover plate for closing the opening thereof.

STEPHEN STRATY.